March 17, 1970
E. K. LINDSTROM
3,501,101
MOBILE FEED GRINDING AND MIXING AND DISTRIBUTING APPARATUS
Filed Dec. 4, 1967
6 Sheets-Sheet 1
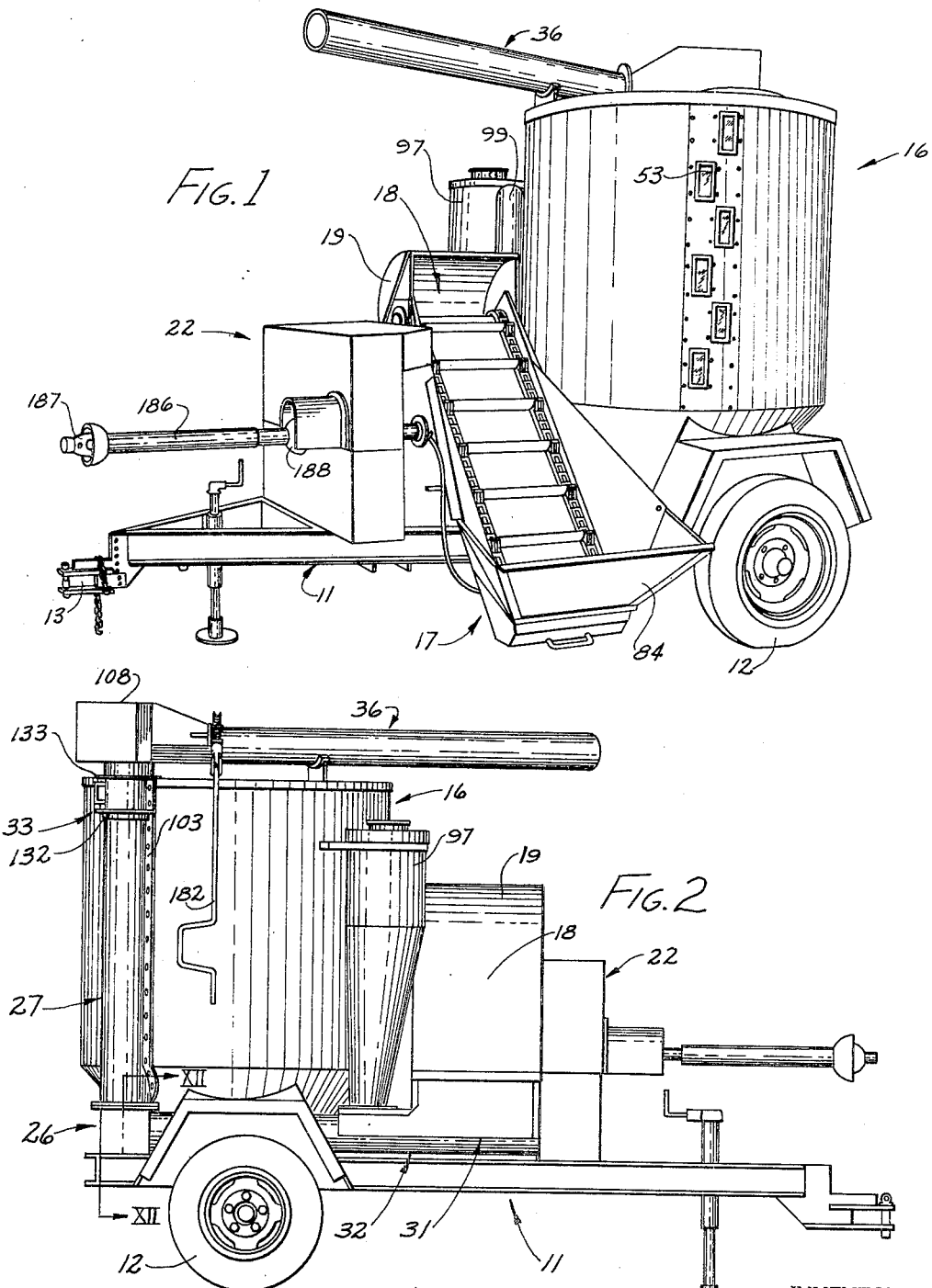
INVENTOR.
EDGAR K. LINDSTROM
BY
ATTORNEYS March 17, 1970     E. K. LINDSTROM     3,501,101

MOBILE FEED GRINDING AND MIXING AND DISTRIBUTING APPARATUS

Filed Dec. 4, 1967     6 Sheets-Sheet 2

INVENTOR.
EDGAR K. LINDSTROM
BY
Woodhams, Blanchard & Flynn
ATTORNEYS

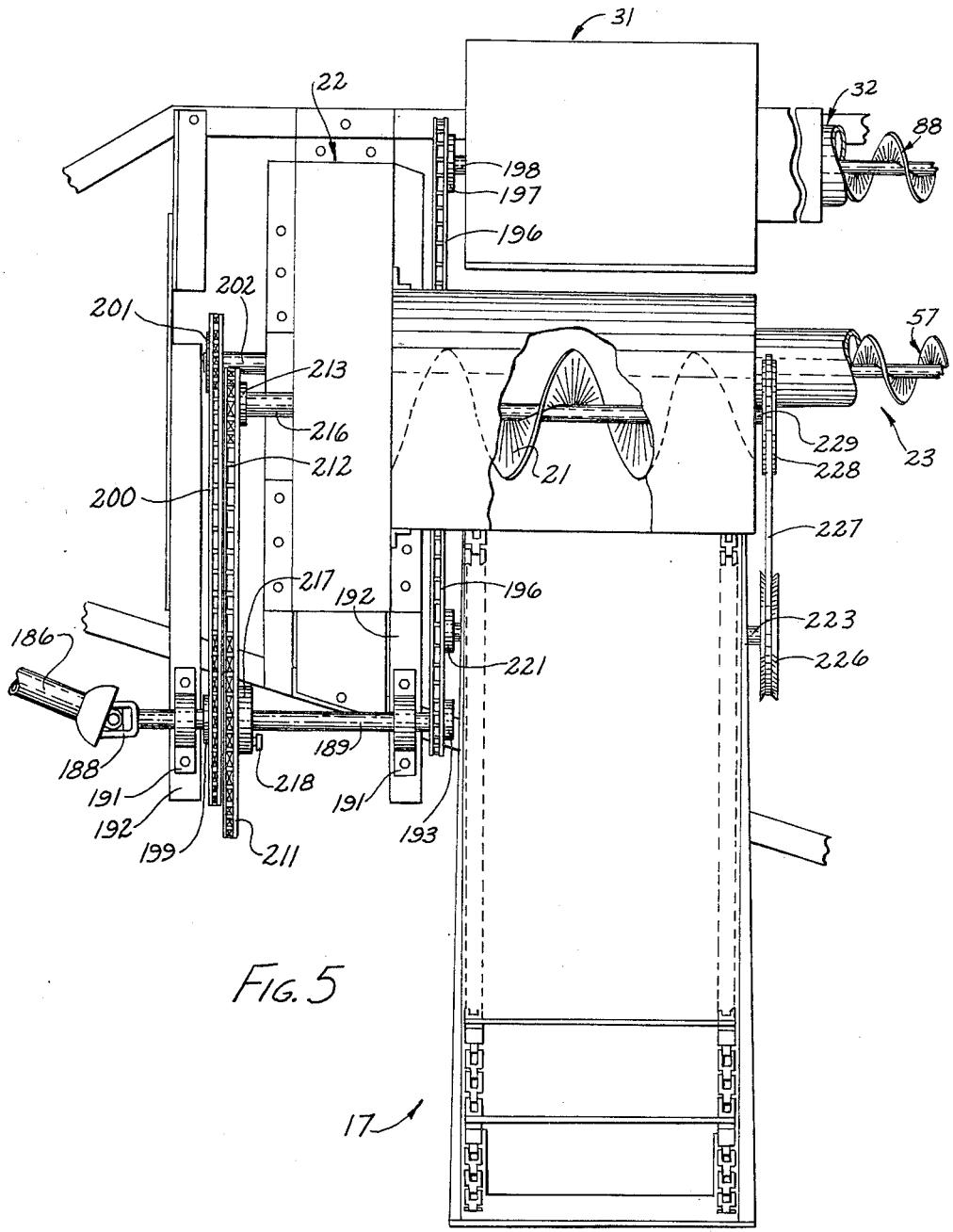

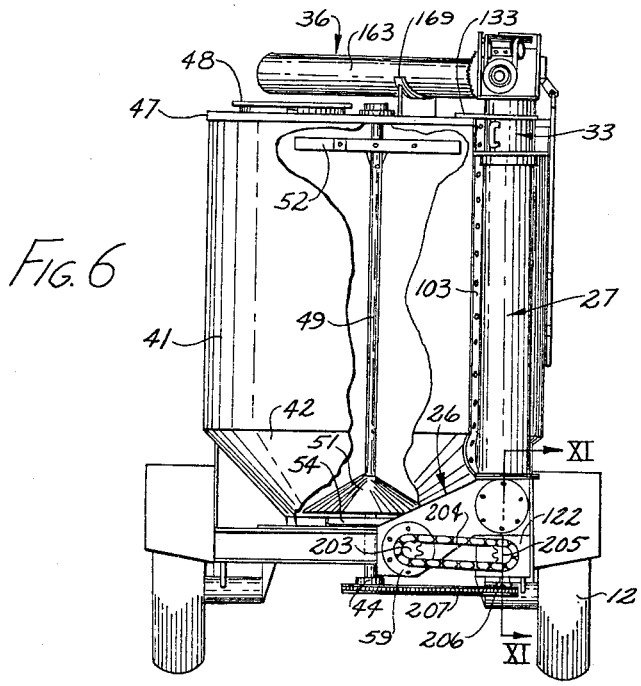
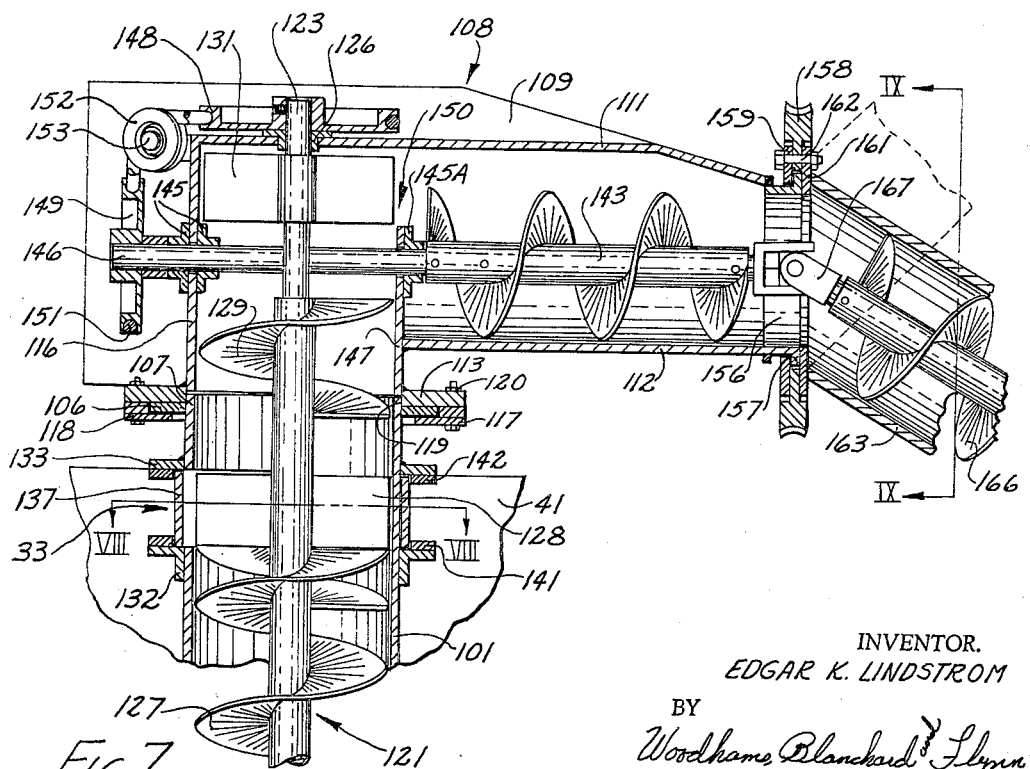

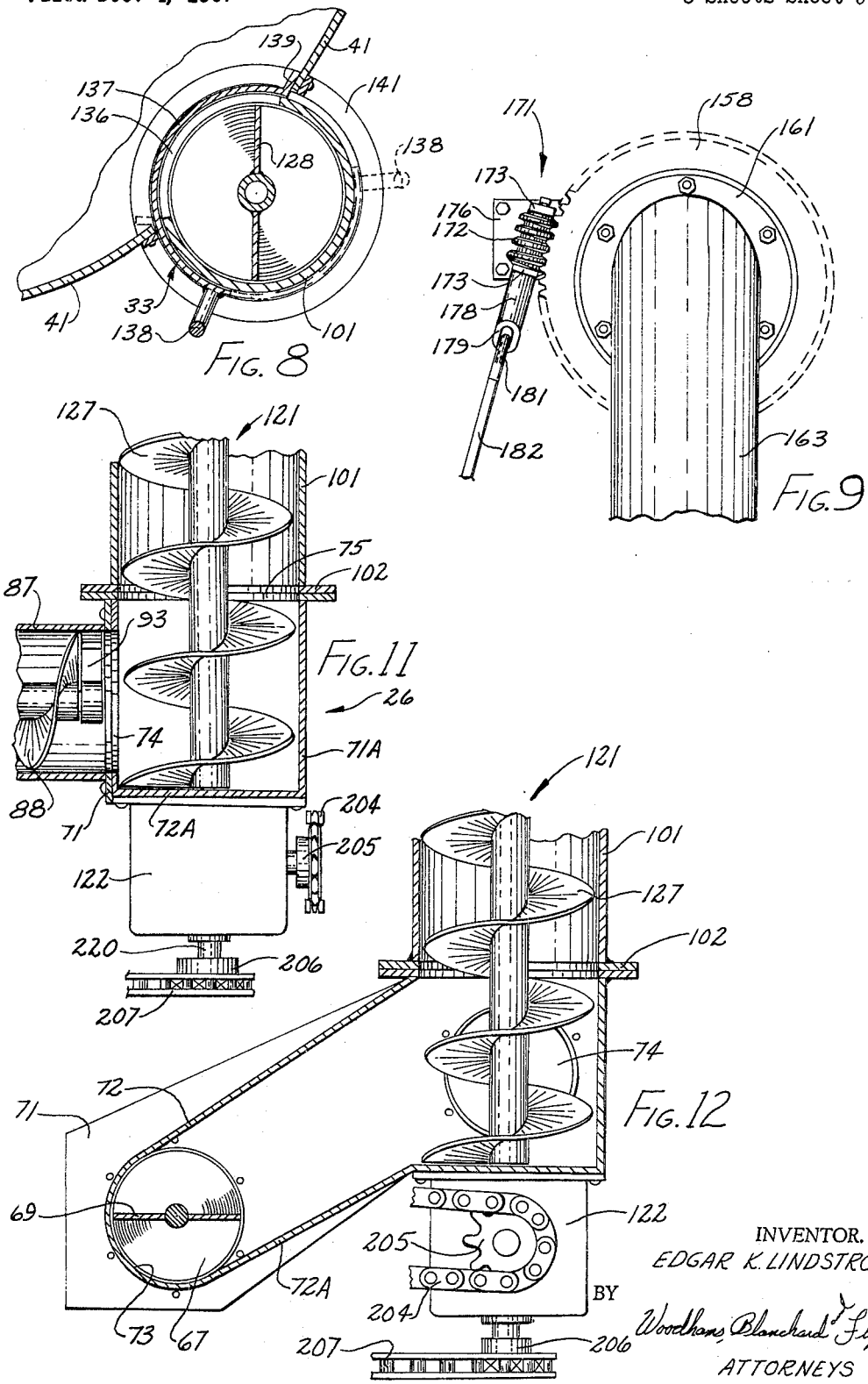

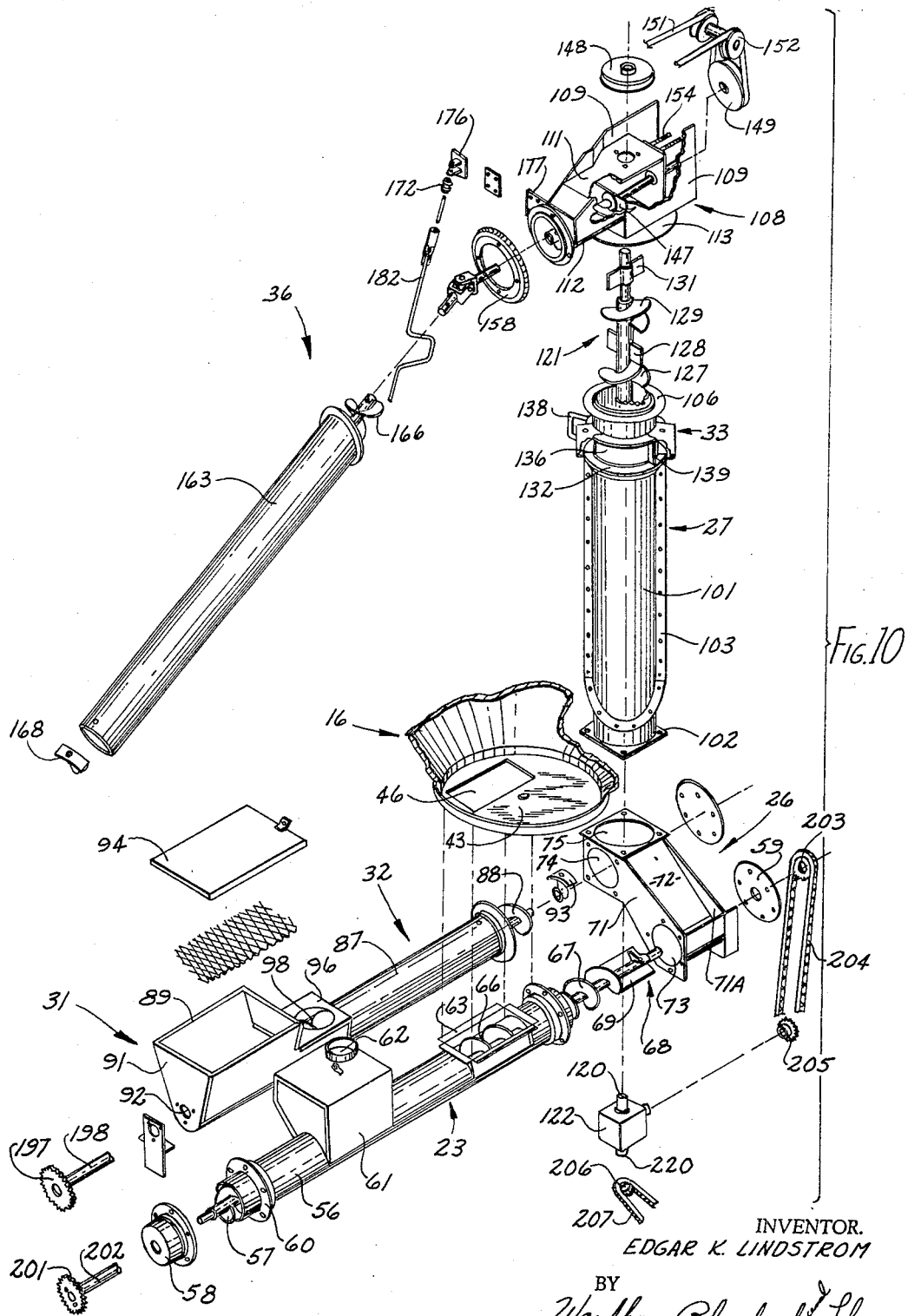

United States Patent Office 3,501,101
Patented Mar. 17, 1970

3,501,101
MOBILE FEED GRINDING AND MIXING AND
DISTRIBUTING APPARATUS
Edgar K. Lindstrom, Manhattan, Kans., assignor to Viking Manufacturing Company, Inc., Manhattan, Kans., a corporation of Kansas
Filed Dec. 4, 1967, Ser. No. 687,543
Int. Cl. B02c 9/04, 17/16; B03b 7/00
U.S. Cl. 241—98
12 Claims

ABSTRACT OF THE DISCLOSURE

Mobile apparatus having a grinding mill thereon for grinding natural feeds. The ground feed is fed through a first screw conveyor into a second upright screw conveyor and is then deposited into the upper end of a mixing tank. A hopper containing feed supplements is positioned adjacent a third screw conveyor to permit supplements to be deposited therein and transported to the second upright screw conveyor for mixing with the natural feed fed from the first screw conveyor. The first screw conveyor passes beneath the mixing tank with a feed opening being provided therebetween to permit material from the tank to be deposited into the first screw conveyor so as to mix same with the feed being supplied by the grinding mill. A valve is provided adjacent the upper end of the second upright screw conveyor to permit the mixed material to be selectively discharged either into the mixing tank or to an external discharge station by means of a swingable discharge conveyor mounted adjacent the upper end of the upright screw conveyor.

FIELD OF THE INVENTION

This invention relates to improvements in a mobile feed grinding, mixing and distributing apparatus and, more particularly, relates to an apparatus wherein natural feed can be ground and intermixed with feed supplements with the resulting mixture being discharged into a tank. The mixture can then be recirculated through the apparatus for remixing same with additional natural feed and/or effecting further mixing of the previously fed materials to improve the uniformity thereof. The material can then be selectively discharged to an external discharge station when desired.

DESCRIPTION OF THE PRIOR ART

While mobile feed grinding, mixing and distributing devices are known in the prior art, these devices possess many disadvantages which have made their use inefficient and undesirable. One of the primary disadvantages of the prior art devices has been their inability to thoroughly and completely intermix natural feed and feed supplements in a uniform and efficient manner. Most of the prior art devices have been able to achieve a uniform intermixing of the material only by a long and time-consuming mixing process. Further, most of these devices have not provided any means whereby the ground material in the storage tank can be uniformly intermixed with the natural feed being fed into the system so as to permit the same to be uniformly mixed in a quick and efficient manner.

Another disadvantage of the prior art devices has been their inability to permit the ground material to be discharged to an external discharge station in a quick and efficient manner. In most of the prior art devices, the ground material is fed into an upright conveyor and then into a second conveyor positioned on top of the upright conveyor for discharging into the storage tank. When it is desired to deposit or discharge the material to an external discharge station, most of the prior art devices have required that the user of the device swing the second conveyor from a tank discharge position into an external discharge position. Further, since the secondary conveyor is often of a rather large size, such a manipulation by the user of the device can often be time consuming and difficult.

Another disadvantage of the prior art devices has been their inability to efficiently discharge the ground material from the tank. In most of the prior art devices, there has been provided either a discharge conveyor swingable in a horizontal plane adjacent the top of the tank or there has been provided a discharge conveyor which is swingable about a feed opening located adjacent the bottom of the tank. While both of these discharge systems permit the material to be discharged over a fence or similar obstruction, they cannot be lowered adjacent the ground on the other side of the fence so as to permit discharge into a low discharge station if desired.

Another disadvantage of these devices has been their inability to be elevated so as to permit discharge into high storage areas such as the loft of a barn, a silo or other similar storage buildings.

Accordingly, the objects of this invention are to provide:

(1) A feed grinding and mixing apparatus that will thoroughly mix ground natural feed materials with feed supplements prior to discharge from the apparatus.

(2) A feed grinding and mixing apparatus, as aforesaid, in which the natural feed and the feed supplements are quickly and uniformly mixed.

(3) A feed grinding and mixing apparatus, as aforesaid, in which natural feed and feed supplements are fed into separate screw conveyors which in turn both feed into an upright screw conveyor wherein the natural feed and the feed supplements are mixed before being discharged into a mixing tank.

(4) A feed grinding and mixing apparatus, as aforesaid, in which a manually operated valve means is provided adjacent the upper end of the upright screw conveyor to permit selective discharge of the material either into the mixing tank or into a substantially horizontal discharge conveyor.

(5) A feed grinding and mixing apparatus, as aforesaid, in which the material in the tank can be deposited into the feed screw which conveys the natural feed from the grinding mill, the material from the tank and the natural feed being mixed in definite proportions so as to achieve a desired uniformity.

(6) A feed grinding and mixing apparatus, as aforesaid, in which the horizontal discharge conveyor is mounted adjacent the upper edge of the mixing tank for efficient discharge of material.

(7) A feed grinding and mixing apparatus, as aforesaid, in which the horizontal discharge conveyor is vertically adjustable to permit same to be angularly raised or lowered as desired for discharging the ground material to a selected discharge station.

(8) A feed grinding and mixing apparatus, as aforesaid, in which means are provided for preventing a possible pressure buildup or blockage in the region where the mixed material is transferred from the upright conveyor into the horizontal discharge conveyor.

(9) A feed grinding and mixing apparatus, as aforesaid, which is more efficient in operation and requires less maintenance and repair.

Other objects and purposes of the invention will be apparent to persons acquainted with apparatus of this general type upon reading the following specification and inspecting the following drawings.

BRIEF DESCRIPTION OF THE DRAWINGS

The drawings illustrate a preferred embodiment of the invention, wherein:

FIGURE 1 is a perspective view illustrating the left side of the grinding and mixing apparatus according to the present invention.

FIGURE 2 is a side elevational view of the right side of the apparatus illustrated in FIGURE 1.

FIGURE 5 is an enlarged fragmentary plan view of the front part of the apparatus.

FIGURE 6 is a rear elevational view, partially broken away, of the apparatus as illustrated in FIGURE 2.

FIGURE 7 is an enlarged fragmentary sectional view taken along the line VII—VII of FIGURE 3 with the discharge conveyor being shown in a broken line position.

FIGURE 8 is an enlarged fragmentary sectional view of the valve mechanism taken along the line VIII—VIII of FIGURE 7.

FIGURE 9 is a partially broken view taken along the line IX—IX of FIGURE 7.

FIGURE 10 is an exploded perspective view of the material screw conveyor system.

FIGURE 11 is a partial sectional view of the mixing box taken along line XI—XI of FIGURE 6.

FIGURE 12 is a partial sectional view of the mixing box taken along line XII—XII of FIGURE 2.

Figure 3:
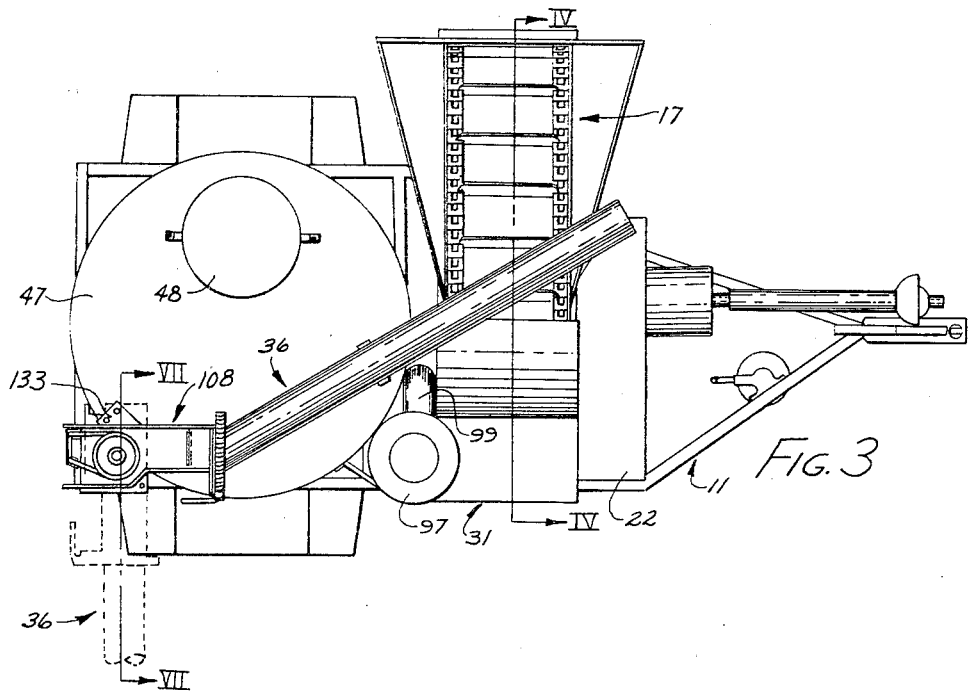
FIGURE 3 is a top view of the apparatus as illustrated in FIGURE 2.

Certain terminology will be used in the following description for convenience and reference only and will not be limiting. The words "upwardly," "downwardly," "rightwardly" and "leftwardly" will designate directions in the drawings to which reference is made. The word "forwardly" will refer to the normal direction of material flow through the device. The words "inwardly" and "outwardly" will refer to directions toward and away from, respectively, the geometric center of the device and designated parts thereof. The word "front" and "rear" will refer to opposite ends of the vehicle, "front" being the end having the tractor hitch thereon. Said terminology will include the words specifically mentioned, derivatives thereof and words of similar import.

SUMMARY OF THE INVENTION

In general, the objects and purposes of the invention have been met by providing an apparatus having a natural feed supply conveyor thereon for feeding natural grains, corn or similar feeds into a grinding mill wherein said natural feeds are ground. The natural feed is then fed into a first substantially horizontal screw conveyor, which conveyor transfers the natural feed into an upright mixing and transferring conveyor. A second screw conveyor is provided for transferring feed supplements from a storage hopper to the upright mixing and transferring conveyor. The upright conveyor mixes the feed supplements and the natural feeds as it moves same upwardly. A manually actuable valve means is provided adjacent the upper end of the upright conveyor which, when in the open position, permits the mixed material to be discharged into a mixing and storage tank. The mixing tank contains an opening in the bottom thereof in communication with the first screw conveyor to permit the mixed material in the tank to be intermixed with the natural feed fed into the first screw conveyor by the grinding mill whereby the material can be recirculated through the apparatus. When it is desired to discharge the mixed material to an external discharge station, the valve means is closed and the material is conveyed from the upright conveyor to a discharge conveyor pivotally mounted adjacent the upper end thereof, which discharge conveyor is of considerable length and pivotable in a horizontal plane to permit the material to be discharged at a remote point. A dam structure is provided at the junction between the upright conveyor and the horizontal discharge conveyor for causing the material from the upright conveyor to be deposited into the upper side of the discharge conveyor. Further, the discharge conveyor is angularly mounted on a rotatable gear member so that upon rotation of the gear, the discharge conveyor is angularly raised or lowered as desired.

DETAILED DESCRIPTION

The apparatus for performing the grinding, mixing and distributing function of the present invention comprises a towable trailer having a frame 11, a pair of support wheels 12 and a towing hitch 13 by means of which the trailer can be connected to a farm tractor or the like (not illustrated) having a power takeoff shaft. A tank structure indicated generally at 16 is mounted at the rear of the frame between the wheels 12. Forwardly of the tank is a natural feed supply conveyor indicated generally at 17 for delivering natural feed into a feed box 18 having a hood 19 thereover. A screw conveyor 21 (FIGURE 4) is located in the bottom of the feed box 18 for delivering the natural feed to a grinding mill indicated generally at 22 which mill is located near the front of the frame. The mill 22 can be of the type illustrated in Patent No. 2,617,600 and since the details thereof form no part of the present invention, the same will not be described in detail herein.

Figure 4:
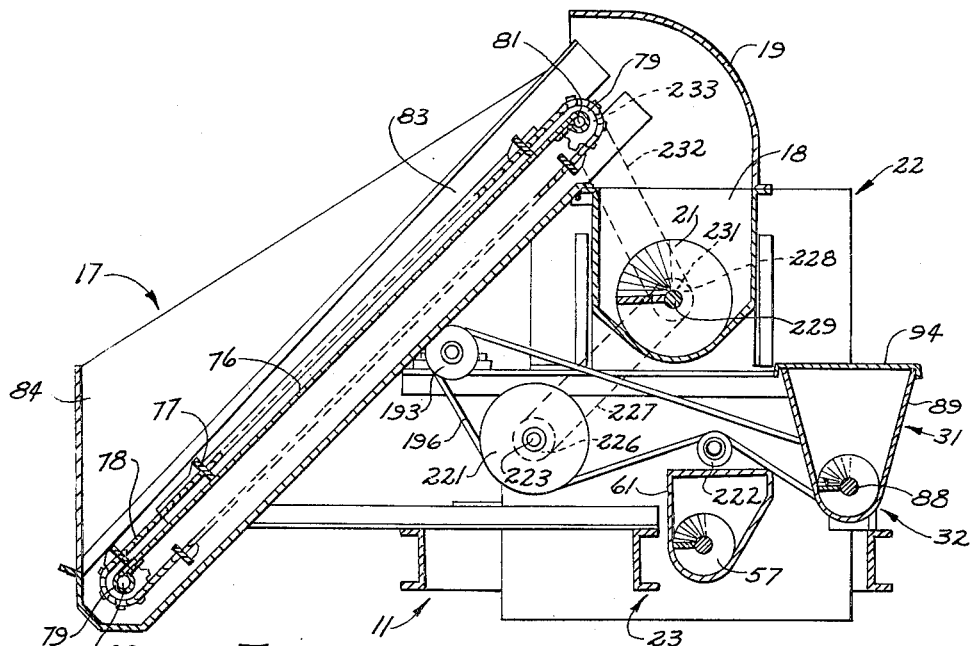
FIGURE 4 is a cross-sectional view taken along the line IV—IV of FIGURE 3.

After being ground, the natural feed is carried rearwardly away from the grinding mill 22 by means of a first rearwardly extending, substantially horizontal screw conveyor indicated generally at 23 (FIGURES 4 and 5). The first screw conveyor 23 passes beneath the bottom of the tank structure 16 and is adapted to receive a proportionate amount of mixed material from the interior of the tank as hereinafter further described. The material transferred to the first screw conveyor 23 is then delivered to a mixing box 26 (FIGURE 2) wherein the material is then delivered to the lower end of an upright screw conveyor indicated generally at 27.

A second screw conveyor indicated generally at 32 is also provided in substantially parallel relationship to the first screw conveyor 23 for delivering feed supplements from a feed supplement supply hopper 31 to the mixing box 26. The upright screw conveyor 27 picks up the natural feed and the feed supplements, conveys same upwardly along the length thereof and simultaneously effects mixing of the natural feed and the feed supplements. A valve mechanism 33 is positioned adjacent the upper end of the upright screw conveyor 27 and, when in the open position, permits the mixed material to be deposited in the interior of the tank structure 16. Alternatively, if the valve mechanism is closed, the material is forced upwardly by the upright conveyor into a discharge screw conveyor indicated generally at 36 for discharging the material to an external discharge station.

Having considered the overall arrangement of the grinding, mixing and distributing apparatus according to the present invention, specific details thereof will now be described.

Considering first the tank structure 16 as illustrated in FIGURES 1, 3, and 6, same comprises a substantially cylindrical tank 41 with the lower portion thereof having downwardly converging walls 42 bounded by a bottom wall 43 (FIGURE 10). The bottom wall 43 is provided with a discharge opening 46 therein for a purpose to be explained hereinafter. The top of the tank structure is closed by means of a top wall 47 having a removable access cover 48 thereon. A rotatable vertical shaft 49 is centrally positioned within the tank with the opposite ends thereof being rotatably supported in the top and bottom walls, respectively. The lower end of the shaft 49 extends through and below the bottom wall 43 and is provided with a drive sprocket 44 on the lower end thereof. The rotatable shaft 49 has a paddle 52 mounted at the upper end thereof for spreading and leveling the material as it is fed into the tank. A downwardly diverging conical deflector 51 is mounted on the shaft 49 directly above the bottom wall 43 for causing the material in the middle of the tank to be diverted and mixed with material located along the sides of the tank as the material is discharged from the tank. Mixing blades 54 also are secured to the lower end of shaft 49 directly below the deflector 51. A plurality of vertically spaced windows 53 are provided along one side of the tank to permit visual observation of the depth of material contained in the tank.

The natural feed supply conveyor 17 as illustrated in FIGURE 4, consists of a suitable plate 76 over which flight bars 77 are advanced upwardly by a pair of parallel side chains 78. The chains pass over sprockets 79 which are mounted upon an upper drive shaft 81 and a lower idler shaft 82, respectively. Suitable side frame members 83 support the conveyor plate and the shafts 81 and 82 of the conveyor and constitute sidewalls for the conveyor structure. A widened hopper 84 at the lower end of the conveyor having canvas side flaps so as to make same adjustable facilitates loading natural feeds therein.

Material from the conveyor 17 is transported by the screw conveyor 21 into the grinding mill 22 wherein the material is ground and is then carried out of the mill by means of a screw conveyor 23. As illustrated in FIGURE 10, the screw conveyor 23 comprises a generally cylindrical housing 56 having a rotatable screw auger 57 therein, opposite ends of which are rotatably supported in a pair of end members or plates 58 and 59. The front end of the cylindrical housing 56 has a mounting flange 60 secured thereto which flange is bolted to the rear wall of the housing surrounding the grinding mill 22. The support plate 58 is similarly bolted to the front wall of the housing surrounding the grinding mill 22 so that the front portion of the screw 57 is positioned within the lower portion of the grinding mill 22.

The cylindrical housing 56 extends substantially lengthwise of the trailer structure and passes underneath the tank structure 16. The housing 56 has an enlarged seat portion 63 thereon defining a tank feed opening 66 which registers with opening 46 in bottom wall 43. The seat portion 63 is positioned beneath the bottom wall 43 of the tank with said seat portion in snug bearing engagement therewith.

The mixing box 26 (FIGURES 10–12) is comprised of a pair of substantially parallel sidewalls 71 and 71A, which walls are interconnected by means of a top wall 72 and a bottom wall 72A so as to define a hollow elongated upwardly inclined chamber. The sidewall 71 is provided with a circular opening 73 adjacent the lower end of the inclined chamber formed by the mixing box. A circular opening 74 is provided in the sidewall 71 adjacent the upper end of the chamber. An additional circular opening 75 is provided in the top wall of the mixing box 26 adjacent the upper end thereof.

The rearward end of the cylindrical housing 56 is fixedly interconnected to the sidewall 71 of the hollow mixing box 26 adjacent the lower side of said feed box. The sidewall 71 has a circular opening 73 therein through which extends the ends of the screw auger 57. As illustrated in FIGURE 10, the screw auger has a conventional helical screw flight 67 extending substantially the entire length thereof. However, the extreme rearward end portion (rightward end in FIGURE 10) of the screw auger, which end portion is positioned within the mixing box 26, is provided with a flipper 68. The flipper 68 comprises a pair of outwardly extending radial blades 69 for directing the natural feed sidewardly and upwardly in the feed box 26.

The second screw conveyor 32 also extends lengthwise of the trailer in substantially parallel relationshp to the first screw conveyor 23, the second screw conveyor 32 being sidewardly and upwardly offset relative thereto. The second screw conveyor 32 comprises a generally cylindrical housing 87 having a rotatable screw auger 88 therein. The feed supplement supply hopper 31 is fixedly secured to the cylindrical housing 87 adjacent the front end thereof and has a pair of downwardly converging sidewalls 89 substantially as illustrated in FIGURE 4 to cause the feed supplement to flow downwardly into the region of the rotatable screw auger 88. The supply hopper 31 has a hinged cover 94 for permitting the supply hopper to be refilled with supplements as needed. The feed supplement hopper 31 is provided with an end wall structure 91 having a bearing opening 92 therein so as to rotatably receive and support one end of the screw auger 88. The other end of the screw auger is rotatably supported within a bearing hanger 93 (FIGURE 11) which is fixedly secured to the cylindrical housing 87 adjacent the mixing box 26. The rearward end of the cylindrical housing 87 is fixedly secured to the sidewall 71 of the mixing box with the interior of the housing being coaxially aligned with the circular opening 74 provided therein whereby the rearward end of the screw auger 88 substantially terminates in the plane of the sidewall 71 as illustrated in FIGURE 11.

The cylindrical housing 87 is further provided with a fixed seat portion 96 thereon adjacent the rearward side (rightward side in FIGURE 10) of the supplement hopper 31, which seat portion is used for fixedly mounting thereon a dust collector 97 (FIGURE 2). The seat portion is provided with an access opening 98 therein so as to permit intercommunication between the dust collector and the interior of the cylindrical housing 87. The upper end of the dust collector 97 is connected to a vertical pipe 99, the lower end of which is mounted on a flange 62 (FIGURE 10) formed on the air chamber 61. The dust collector 97 preferably comprises a cyclone type separator whereby air from the screw conveyor 23 passes through pipe 99 into the collector 97 wherein the dust is separated out and deposited into the screw conveyor 32. The air chamber 61 is provided so as to allow some of the dust particles to settle out before the air moves into the collector 97.

The upright screw conveyor 27, which is interconnected to the screw conveyors 23 and 32 by means of the mixing box 26, comprises a substantially cylindrical housing 101 (FIGURE 10) positioned adjacent the external wall of the tank 16. The housing 101 has a mounting flange 102 at the lower end thereof to permit the housing to be fixedly secured to the upper wall of the mixing box 26 in coaxial alignment with the circular opening 75. The cylindrical housing 101 is also provided with a longitudinal seating flange 103 integrally formed thereon, which seating flange enables the housing to be fixedly secured to the wall of the cylindrical tank 41 by bolts or similar securing means. A transverse seating flange 106 is provided adjacent the upper end of the housing 101, which flange is slightly spaced from the extreme end of the housing so as to define an annular lip portion 107 (FIGURE 7).

A swivel housing 108 is rotatably mounted on the upper end of the cylindrical housing 101. As illustrated in FIGURES 7 and 10, the swivel housing comprises a pair of sidewalls 109 fixedly interconnected by means of a top wall 111 and a pair of bottom walls 112 and 113, respectively. A rear wall 116 is also secured to the sidewalls 109, the top wall 111 and the bottom wall 113 by any suitable means, such as by welding. The bottom wall 113, which functions as a bearing plate, is provided with a circular opening 119 therein, which opening has a diameter substantially equal to but slightly larger than the external diameter of the cylindrical housing 101. As illustrated in FIGURE 7, the lip portion 107 is received within the opening 119 formed in the bearing plate 113. The lower surface of the bearing plate 113 bears against the upper surface of the seating flange 106 to permit the swivel housing 108 to be rotatably seated on the upper end of the housing 101. Further, a pair of flange members 117 and 118 are positioned adjacent the lower side of the seating flange 106, being connected to the bearing plate 113 by means of bolts 120 so as to prevent the swivel housing 108 from becoming disconnected from the housing 101.

A screw auger 121 (FIGURE 10) is rotatably positioned within the housing 101. The lower portion of the auger 121 extends through the opening 75 into and through the mixing box 26 as illustrated in FIGURE 12. The lower end of the auger 121 is rotatably supported by means of a shaft 120 (FIGURE 10) of a gear box 122 which is fixedly secured to the frame 11 in a position adjacent the lower surface of the mixing box 26 directly under the vertical screw auger 121. The upper end 123 of the screw auger 121 is rotatably supported within a bearing sleeve 126 fixedly positioned within the top wall 111 of the swivel housing 108. The screw auger 121 is comprised of a first conventional helical screw flight 127, the lower end of which extends through the opening 75 and is received within the upper end of the chamber formed by the mixing box 26. The upper end of the screw flight 127 terminates in a first flipper 128 which comprises a pair of radially extending blade members. A second short helical screw flight 129 of slightly more than one full turn is positioned above and axially spaced from the first flipper 128. The screw flight 129 preferably has a pitch approximately one-half that of the screw flight 127. A second flipper 131 is positioned above and axially spaced from the second screw flight 129.

As illustrated in FIGURES 7 and 8, the first flipper 128 is positioned in the region of the valve mechanism 33. The valve mechanism 33 includes a lower annular flange member 132 fixedly secured to the housing 101 and an upper annular flange member 133 also fixedly secured to the housing 101 adjacent the upper edge of the tank 41. The upper flange 133 is large enough to extend over the top wall 47 of the tank and is rigidly secured thereto. The housing 101 has an arcuate opening 136 (FIGURE 8) between the flanges 132 and 133, which opening communicates with the interior of the tank 41. A manually actuable valve member comprising an arcuate plate 137 having a handle 138 thereon is movably positioned between the lower and upper flanges 132 and 133, the arcuate plate 137 having a curvature slightly greater than the outside diameter of the housing 101 so as to be slideably and arcuately movable relative thereto. The end of the arcuate plate 137 is provided with a radially extending stop lug 139 adapted to contact the adjacent edges of the tank wall 41 so as to limit the movement of the plate 137 between the open and closed positions. A pair of parallel retaining rings 141 and 142 are fixedly secured to the lower and upper flanges 132 and 133, respectively, so as to maintain the valve member in confined relationship with respect to the housing 101. Alternately, the rings 141 and 142 can be secured to the lower and upper edges of the arcuate valve plate 137 so as to make an integral valve ring unit, which unit will rotate about housing 101 with the rings 141 and 142 sliding between the flanges 132 and 133, respectively.

When the valve member 137 is in the closed position illustrated in solid lines in FIGURE 8, the material transferred by the upright conveyor 27 is forced upwardly into the swivel housing 108. The housing 108 has an intermediate screw auger 143 (FIGURE 7) rotatably mounted therein, which auger has a bearing shaft 146 extending from one end thereof. The bearing shaft 146 is rotatably supported by means of bearing sleeves 145 and 145A provided in the rear wall 116 and in the intermediate wall or dam 147, respectively. The intermediate screw auger 143 is rotatably driven from the upright screw auger 121. In this embodiment a drive pulley 148 is rotatably mounted on the upper end 123 of the screw auger 121. A driven pulley 149 is rotatably mounted on the end of the bearing shaft 146. The pulleys 148 and 149 are interconnected by means of a drive belt 151, which belt passes over a pair of idler rollers 152 rotatably mounted on an idler shaft 153 secured to rear wall 116 by a pair of take-up bolts 154.

The forward end of the swivel housing 108 is provided with a cylindrical adapter 156 which is fixedly secured thereto. The adapter has an annular rim 157 on the forward edge thereof upon which is rotatably mounted a worm gear 158. The gear 158 is axially held in position upon the annular rim 157 by means of a pair of retaining plates 159 and 161, respectively which are positioned on opposite sides of and overlap the gear and retaining rim. The plates 159, 161 and the gear 158 are secured together by means of bolts 162 so as to permit the gear and the retaining plates to be rotatable relative to the annular rim 157.

The front retaining plate 161 has a cylindrical housing 163 fixedly secured thereto by means of welding or the like. The cylindrical housing 163 is angularly inclined with respect to the rotational axis of the gear 158, preferably at an angle of approximately 30 degrees. A discharge screw auger 166 is rotatably mounted within the cylindrical housing 163 with one end thereof being rotatably interconnected to the intermediate screw auger 143 by means of a universal joint 167. The other end of the discharge screw auger 166 is rotatably supported by means of a bearing hanger 168 (FIGURE 10) which is fixedly secured to the cylindrical housing 163 at the discharge end thereof.

When not in use, or when not discharging to an external discharge station, the discharge screw conveyor 36 is normally maintained in a storage position substantially as illustrated in FIGURES 3 and 6 wherein the cylindrical housing 163 rests upon a support member 169 fixedly secured to the top wall 47 of the tank structure. When it is desired to discharge material from the device, the swivel housing 108 is pivoted outwardly so as to permit the cylindrical housing 163 to project out beyond the periphery of the tank substantially as illustrated in dotted lines in FIGURE 3.

Further, if desired, the cylindrical housing 163 containing the discharge screw auger 166 therein can be angularly raised or lowered by means of an adjustment device 71 illustrated in FIGURE 9. The adjustment device comprises a worm 172, the teeth of which are in mesh with the teeth formed on the worm gear 158. The worm 172 is rotatably mounted between a pair of projecting ears 173 integrally fixed to a mounting plate 176. The mounting plate 176 is fixedly secured by means of bolts or the like to an extension 177 (FIGURE 10) formed on the cylindrical adapter 156. The worm is provided with a coupling portion 178 rotatably secured thereto, the coupling portion having a hook 179 on the end thereof which is engaged by a similar hook 181 formed on the end of a manually rotatably handle 182. Manual rotation of the handle 182 and consequent rotation of the worm 172 and worm gear 158 causes the cylindrical housing 163 with the discharge auger 166 therein to be moved from a horizontal position to a downwardly inclined position illustrated in FIGURE 7 or to an upwardly inclined position indicated in dotted lines in FIGURE 7.

One additional feature of considerable importance is the provision within the swivel housing 108 of the intermediate wall or dam 147, which dam is fixedly connected to the bottom walls 112 and 113 and extends between the sidewalls 109. Dam 147 is primarily provided to prevent material from being carried up to the intermediate screw 143 when the valve member 137 is in the open position. As illustrated in FIGURE 7, the dam 147 only extends slightly more than half way between the upper wall 111 and the bottom wall 112 so that an opening 150 is provided between the upper wall 111 and the upper edge of said dam. Further, the second flipper 131 is positioned in lateral alignment with opening 150 whereby material conveyed upwardly by the second screw flight 129 into the region of the second flipper 131 is thrown through the opening 150 into the space above the intermediate screw auger 143. Thus, the material fed into the intermediate screw auger 143 is all fed into the upper side thereof, the dam 147 preventing any material from being fed into the intermediate screw auger adjacent the lower side thereof.

Considering now the drive means for the several screw conveyors and the grinding mill, same are connected to be driven by a power takeoff shaft 186 (FIGURE 1) connectible by a universal joint 187 to a power takeoff shaft of a tractor (not shown). As shown in FIGURE 5, the shaft 186 is connected by another universal joint 188 to a drive shaft 189 mounted in suitable bearings 191 on frame elements 192 attached to the frame 11. A sprocket 193 on the shaft 189 continually drives a chain 196 that extends down and across to a sprocket 197. The sprocket 197 is mounted on a shaft 198 which extends outwardly from beneath the feed supplement hopper 31. The shaft 198 extends into the bottom portion of the feed supplement hopper 31 and is interconnected to and drives the rotatable screw auger 88 of the conveyor 32 in order to move feed supplements from the hopper as previously described.

A further sprocket 199 is fixedly mounted on the shaft 189 for driving a chain 200 that extends down and across to a sprocket 201 mounted on the end of a shaft 202, which shaft 202 is fixedly secured to and rotatably drives the rotatable screw auger 57 of the screw conveyor 23.

As illustrated in FIGURES 6 and 10, the other end of the screw auger 57 has a sprocket 203 fixedly secured thereon, which sprocket drives a chain 204 extending therefrom into driving engagement with a sprocket 205 rotatably secured to the input shaft of the gear box 122. The gear box 122 is provided with an output shaft 220 on the lower side thereof on which is fixedly mounted a driven sprocket 206. The sprocket 206 drivingly engages a chain 207 extending therefrom into driving engagement with the sprocket 44 mounted on the lower end of the rotatable tank mixing shaft 49.

The output shaft 120 of the gear box 122 is also rotatably connected to the lower end of the upright screw auger 121, which in turn drives the intermediate screw auger 143 by means of the pulleys 148 and 149 interconnected by the drive belt 151. Similarly, intermediate screw auger 143 rotatably drives the discharge screw auger 166 by means of the universal joint 167 interconnecting same.

To permit selective driving of the grinding mill 22, the drive shaft 189 (FIGURE 5) is provided with a freely rotatable sprocket 211 drivingly engaging a chain 212 that extends to a coacting sprocket 213 fixedly mounted on the drive shaft 216 of the grinding mill 22. Sprocket 211 is selectively drivingly connectible to the shaft 189 by means of a clutch collar 217 fixedly secured to the shaft, the clutch collar having an axially movable clutch pin 218 which can be manually engaged with the sprocket 211 so as to permit the grinding mill to be driven at times as selected by the operator.

The natural feed supply conveyor 17 and the input screw auger 21 can also be selectively driven. As illustrated in FIGURES 4 and 5, the drive chain 196 used for driving the screw conveyor 32 also drivingly engages an intermediate drive sprocket 221 and a tensioning input screw conveyor 21. A further pulley 231 is fixedly secured to a countershaft 223 which extends underneath the feed conveyor 17. The other end of countershaft 223 has a conventional adjustable pulley 226 fixedly mounted thereon. A belt 227 extends from the pulley 226 to a pulley 228 fixedly secured to the drive shaft 229 of the input screw conveyor 21. A further pulley 231 is fixedly secured to the drive shaft 229 and has a belt 232 drivingly engaging same and extending to a driven pulley 233 fixedly secured to the feed conveyor drive shaft 81.

OPERATION

Although the operation of the device embodying the invention has been indicated somewhat above, said operation will be described in detail hereinbelow for a better understanding of the invention.

In operation of the apparatus, the shaft 186 is connected to the power takeoff of a tractor. Further, the axial clutch pin 218 is engaged with the freely rotatable sprocket 211 to effect driving of the drive shaft 216 of the grinding mill 22, and the adjustable pulley 226 is tightened to prevent slip of the belt 227 whereby the input screw conveyor 21 and the natural feed supply conveyor 17 will be driven. Similarly, assuming that it is initially desired to deposit the ground feed into the cylindrical tank 41, the valve member 137 is manually moved to the open position as illustrated by dotted lines in FIGURE 8. Hopper 31 is also filled with feed supplements.

The tractor engine and the power takeoff shaft thereof are then started. A supply of natural feed is then deposited in the hopper 84 whereby the feed is carried upwardly and dropped into the feed box 18. The input screw conveyor 21 then carries the natural feed into the grinding mill 22 whereby same is ground to the consistency and size desired.

The ground feed from the grinding mill 22 then drops downwardly into the vicinity of the rotatable screw auger 57 whereby the feed is conveyed to the mixing box 26. If any mixed material is initially contained in the tank 41, same will discharge therefrom through the openings 46 and 66 into the interior of the housing 56 whereby the material will become mixed with the natural feed supplied by the grinding mill 22 and will be conveyed by the screw auger 57 to the mixing box 26. Upon reaching the mixing box 26, the flipper 68 on the end of the screw auger 57 will cause the material to be thrown outwardly and upwardly from the lower end of the chamber into the upper end of the chamber so that the material can be picked up by the lower end of the upright screw auger 121.

Simultaneous with the above-described operation, the other screw conveyor 32 will function to convey feed supplements from the feed supplement hopper 31 to the upper end of the chamber in the mixing box 26.

Rotation of the upright screw auger 121 will cause the screw flight 127 thereof to pick up the feed supplement supplied by the auger 88 and the ground feed supplied by the auger 57 and convey same upwardly through the cylindrical housing 101, the feed supplement and the natural feed being mixed as it is conveyed upwardly through the housing. Upon reaching the first flipper 128, the feed and supplement mixture will be thrown radially outwardly and, due to the fact that the valve member 137 is in the open position (broken line position in FIGURE 8), the material will be thrown through the arcuate opening 136 into the interior of the tank 41. The material thrown into the tank will be further contacted and distributed due to the rotating paddles 52 contained therein.

The above procedure will be continued until the desired amount of natural feed has been feed into the apparatus, at which time the adjustable pulley 226 will be moved to a released position and the clutch pin 218 will also be moved to a released position so as to disengage the drive of the natural feed conveyor 17, the input screw conveyor 21 and the grinding mill 22. However, assuming that the desired uniformity of the material has not yet been achieved, the remainder of the apparatus can continue to run whereby the material in the tank 41 will be discharged through the bottom feed opening 46 into the screw conveyor 23, the screw auger 7 will convey the material into the mixing box 26, the upright screw auger 121 will convey the material upwardly until same is again discharge into the interior of the tank 41 by means of the first flipper 128. This recirculation of the material can continue until the desired uniformity of the mixture has been achieved. Further, additional feed supplements can be supplied to the material by means of the hopper 31 and the screw auger 88 if desired.

After the desired uniformity has been achieved and it is desired to discharge the mixture, the discharge conveyor 36 is moved from the storage position illustrated in solid lines in FIGURE 3 to a discharge position as illustrated in dotted lines in FIGURE 3 wherein the cylindrical housing 163 containing the discharge screw auger 166 therein projects laterally outwardly beyond the edge of the tank 41. This latter movement is accomplished by manually swiveling the housing 108 in a horizontal plane about the upper seating flange 106. Further, if it is desired that the material be discharged either to a high or a low location, the housing 163 with the discharge screw auger 166 therein can be raised or lowered by manually rotating the handle 182 which in turn causes rotation of the housing 163 due to rotation of the worm gear 158 by means of the worm 172. After the discharge conveyor 36 has been positioned as desired, the valve member 137 is then manually moved to the closed position as indicated in solid lines in FIGURE 8 to permit commencement of the discharge operation.

With the valve mechanism in the closed position, the material being conveyed upwardly by the upright screw auger 121 can no longer escape through the opening 136 into the tank 41. Consequently, the continued upward flow of material by the screw auger 121 forces the material upwardly past the first flipper 128 whereby the material comes into contact with the second screw flight 129 and is conveyed upwardly into the swivel housing 108. Due to the presence of the dam or intermediate wall 147 adjacent the end of the intermediate screw auger 143, the material cannot be fed into the lower region of the screw. This could possibly cause a pressure buildup and possibly result in a stoppage of material within the housing. Rather, the second screw flight 129 continues to force the material upwardly until the same comes into contact with the second flipper 131, which flipper throws the material radially outwardly through the opening 150 defined by the upper edge of the dam 147 and the top wall 111 of the swivel housing. The material thrown through the opening 150 is then deposited into the upper portion of the intermediate screw auger 143 whereby the material is then conveyed forwardly into the discharge screw auger 166, which in turn causes the material to be discharged from the outlet end of the housing 163 at the desired location.

Another desirable feature of the present invention resides in the flow capacity of the screw auger 57 relative to the discharge capacity of the grinding mill 22. In particular, the screw auger 57 is of such a size and rotates at such a speed that, even when the grinding mill 22 is discharging ground natural feed at its maximum rate, the screw auger 57 when leaving the receiving box 61 is only approximately half full of ground material. Consequently, the other half of the auger is substantially filled with mixed material from the tank 41 as the auger passes underneath the tank feed opening 66. In this manner, a partial mixing or blending of the mixed material from the tank and the natural feed material from the grinding mill 22 occurs before the material is fed to the upright screw auger 121.

As an alternate manner of performing the same function as described above, the screw auger 57 could be formed of two portions having different diameters, the first portion being of smaller diameter for conveying the natural feed from the receiving box 61 into a region adjacent the tank feed opening 66. The first screw portion could be rigidly interconnected to a second screw portion of larger diameter, the second screw portion having a capacity substantially equal to twice that of the first screw portion whereby additional material could thus be discharged from the tank 41 into the screw auger whereby the material would then be intermixed and conveyed to the upright screw auger 121.

A still further modification which could be incorporated into the device, if desired, would be the provision of a slideable valve plate between the feed opening 66 and the discharge opening 46, which valve plate could be slideably moved from an opened to a close position so as to control the discharge of material from the tank 41.

Many additional types of valve mechanisms, either manually or mechanically actuated, could be utilized for interconnecting the upright screw auger with the interior of the mixing tank. Further, the relative positions of the screw augers could obviously be modified without departing from the scope of the present invention.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A feed grinding, mixing and distributing apparatus comprising:
   a grinding mill adapted to grind natural feed;
   a hopper adapted to receive feed supplements therein;
   a mixing tank having an inlet and a discharge opening therein, and a shaft rotatably mounted within said tank and having a mixing impeller fixedly secured thereto;
   first conveyor means adapted to transport natural feed from said mill, feed supplements from said hopper and mixed material from the discharge opening of said tank;
   second conveyor means including an upright screw conveyor positioned adjacent said tank for receiving feed material from said first conveyor means; and
   flow control means mounted adjacent the upper end of said upright screw conveyor for discharging feed material therefrom either to the inlet opening of said tank or to an external discharge station, said flow control means including a swingable conveyor mounted for pivotal movement relative to said tank and adapted to receive material from said upright screw conveyor for discharging same to an external discharge station.

2. An apparatus as defined in claim 1, wherein said flow control means further includes valve means comprising a movable valve member mounted for movement between first and second positions, said valve member when in said first position permitting material to be discharged from said upright screw conveyor into said tank, said valve member when in said second positon permitting material to be conveyed from said upright screw member into said swingable conveyor.

3. An apparatus as defined in claim 2, wherein passage means interconnected said upright screw conveyor with the inlet opening of said tank for permitting flow of material therethrough, said valve member being movable between a first position in which said passage means is open and a second position in which said passage means is closed.

4. An apparatus as defined in claim 3, wherein said upright screw conveyor includes a vertical screw member having a first screw flight thereon with the upper end of said first screw flight terminating substantially adjacent the lower edge of said passage means, said screw member further having a radially directed flipper thereon adjacent the upper end of the said first flight for throwing the material radially outwardly through said passage means into the tank when the valve member is in the open position, said screw member further having a second flight fixedly secured thereto axially above said first flipper and further having a second flipper fixedly secured thereto axially above said second flight, said second flipper causing the material to be conveyed to the swingable conveyor whenever the valve member is in the closed position.

5. An apparatus as defined in claim 1, wherein said upright screw conveyor includes a substantially vertical screw member with said swingable conveyor being mounted substantially adjacent the upper end of said screw member, and said swingable conveyor further including an intermediate screw conveyor therein with the rotational axis of the intermediate screw conveyor being substantially transverse to the rotational axis of said upright screw member, and further including means for causing feed material transferred from the vertical screw member to the intermediate screw conveyor to be deposited into said intermediate screw conveyor adjacent the upper side thereof.

6. An apparatus as defined in claim 5, wherein the means for causing the material to be deposited into the upper side of the intermediate screw conveyor comprises a stationary wall positioned between the intermediate conveyor screw and the vertical screw member with the upper edge of said wall extending upwardly a sufficient extent so as to cause the material to be deposited into the upper half of the intermediate screw conveyor.

7. An apparatus according to claim 6, wherein the vertical screw member is provided with screw flights thereon with the upper end thereof terminating adjacent the upper edge of said wall, said vertical screw member being further provided with a radial flipper on the end thereof above said wall for radially throwing and directing material over said wall into the upper portion of said intermediate screw conveyor.

8. An apparatus as defined in claim 1, wherein said swingable conveyor is mounted on the upper end of said upright screw conveyor and includes a first housing means pivotally swingable in a substantially horizontal plane about said upright screw conveyor and further includes a second housing means interconnected to said first housing means for swingable movement therewith, said second housing means comprising an elongated spout and further including adjustment means for permitting said spout to be angularly raised or lowered relative to a horizontal position.

9. An apparatus as defined in claim 8, wherein said adjustment means includes a gear member rotatably mounted on said first housing means with said spout being fixedly secured to said gear member, the longitudinal axis of said spout being angularly offset relative to the rotational axis of said gear member, and means for rotating said gear member relative to said first housing means for causing said spout to be angularly raised or lowered relative to a horizontal position.

10. An apparatus as defined in claim 1, wherein said first conveyor means comprises a first screw conveyor interconnected between said hopper and the lower end of said upright screw conveyor for transporting feed supplements from the hopper to said upright screw conveyor, said first conveyor means further including a second screw conveyor extending between said grinding mill and the lower end of said upright screw conveyor for transporting ground natural feed from the grinding mill to said upright screw conveyor, and passage means interconnecting the discharge opening of said tank with said second screw conveyor for permitting material contained in said tank to be deposited in said second screw conveyor for recirculation of said material through said upright screw conveyor.

11. An apparatus as defined in claim 10, wherein said second screw conveyor is positioned beneath the bottom wall of said tank with the discharge opening of said tank being provided in said bottom wall in communication with said second screw conveyor, the rotational axis of said second screw conveyor being laterally offset with respect to the rotational axis of said upright screw conveyor, and a mixing means defining a closed chamber being provided adjacent the output end of said second screw conveyor and the lower end of said upright screw conveyor, said second screw conveyor being provided with a radial flipper on the end thereof for causing material to be thrown through said chamber into the region adjacent the lower end of said upright screw conveyor.

12. An apparatus as defined in claim 1, wherein said first conveyor means comprises a first conveyor screw for transferring feed supplements from said hopper to the lower end of said upright screw conveyor and a second conveyor screw for transferring natural ground feed from the grinding mill to the lower portion of said upright screw conveyor, said second conveyor screw being interconnected with the discharge opening of said tank for transferring materials from said tank to said upright screw conveyor, and wherein the flow control means includes a passage interconnecting said upright screw conveyor to the inlet of said tank and further includes a movable valve member movable between an open position so as to permit flow from said screw conveyor through said passage into said tank to a closed position wherein said passage is closed, said upright screw conveyor causing material to be forced upwardly into the swingable conveyor for discharge to an external discharge station when the passage is closed by the valve member, and further including adjustment means for permitting said swingable conveyor to be angularly raised or lowered relative to a horizontal position.

References Cited

UNITED STATES PATENTS

| | | | |
|---|---|---|---|
| 2,152,367 | 3/1939 | Smith | 241—98 X |
| 2,982,484 | 5/1961 | Stahr | 241—101 |
| 3,133,727 | 5/1964 | Luscombe | 241—98 X |
| 3,176,926 | 4/1965 | Hobbs | 241—101 |
| 3,199,796 | 8/1965 | Callum | 241—101 |
| 3,375,985 | 4/1968 | Dodgen | 241—101 X |

ROBERT C. RIORDON, Primary Examiner

U.S. Cl. X.R.

241—101, 301